(12) United States Patent
Hosoda

(10) Patent No.: US 7,677,345 B2
(45) Date of Patent: Mar. 16, 2010

(54) MOVING ROBOT

(75) Inventor: Yuji Hosoda, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 11/349,920

(22) Filed: Apr. 17, 2006

(65) Prior Publication Data
US 2006/0243499 A1   Nov. 2, 2006

(30) Foreign Application Priority Data
Mar. 14, 2005  (JP)  ............................ 2005-070259

(51) Int. Cl.
*B62D 61/00*  (2006.01)
(52) U.S. Cl. .................. 180/218; 180/7.1; 180/6.48
(58) Field of Classification Search ................ 180/218, 180/7.1, 6.48; 701/124; 318/568.12, 568.16
See application file for complete search history.

(56) References Cited

U.S. PATENT DOCUMENTS

| 6,553,271 | B1 | 4/2003 | Morrell | |
| 7,082,350 | B2 * | 7/2006 | Skoog | 700/245 |
| 7,481,291 | B2 * | 1/2009 | Nishikawa | 180/218 |
| 2004/0162636 | A1 | 8/2004 | Hattori et al. | |
| 2008/0105481 | A1 * | 5/2008 | Hutcheson et al. | 180/209 |
| 2008/0231222 | A1 * | 9/2008 | Hashimoto et al. | 318/587 |

FOREIGN PATENT DOCUMENTS

| JP | 63-305082 | 12/1988 |
| JP | 2530652 | 6/1996 |
| JP | 2003-271243 | 9/2003 |

* cited by examiner

*Primary Examiner*—Tony H. Winner
(74) *Attorney, Agent, or Firm*—Antonelli, Terry, Stout & Kraus, LLP.

(57) ABSTRACT

Within a moving robot of narrow footprint, having quick traveling performance on a plane-surface, as well as, anti-tumbling function, and further being suitable for operations under coexistence with a human being, being able to travel coping with traveling situations on a level difference, etc.: in front and rear of main driving wheels 2 and 3, each being controlled through the inverted pendulum control, are disposed supporting legs 4 and 5, tips of which can be lifted up and down, wherein the tips of the supporting legs 4 and 5 are positioned to keep a predetermined distance between a traveling surface, when running on the inverted two-wheels travel, and the supporting legs 4 and 5 are fixed or either one in the fall-down direction is thrust out into the fall-down direction, so as to protect it from falling down. Further, upon the basis of detection information of floor-surface distance sensors 4e and 5e and side-surface distance sensor 4f, 4g, 5f and 5g, which are provided at the tips of the supporting legs 4 and 5, the robot senses an existence of a level difference and/or an inclined surface, so as to let the supporting legs to escape from the level difference and/or the inclined surface, and holds the position of gravity center thereof, stably, through other one of the supporting legs, being landed on the ground, and the main driving wheels 2 and 3; thereby enabling to travel over the level difference and the inclines surface.

14 Claims, 15 Drawing Sheets

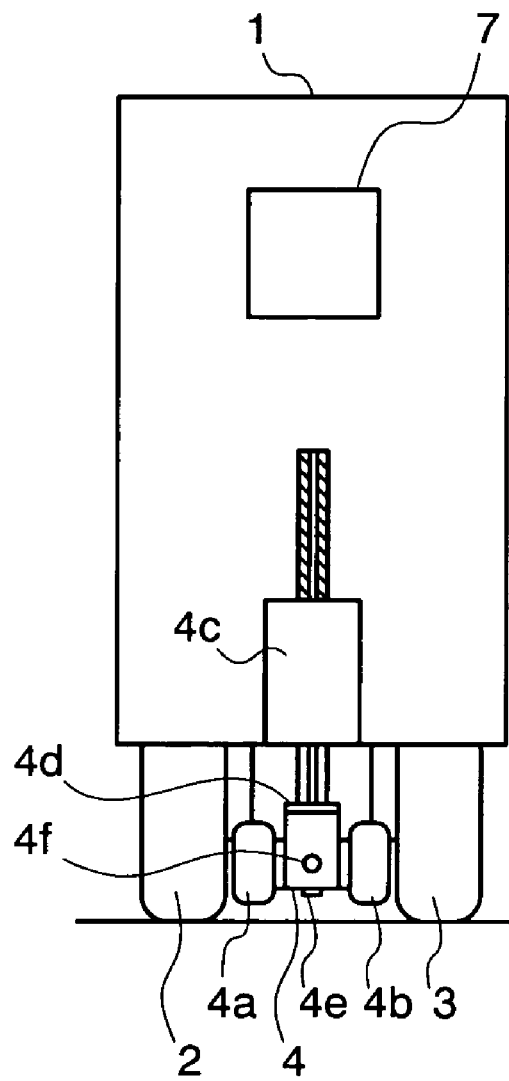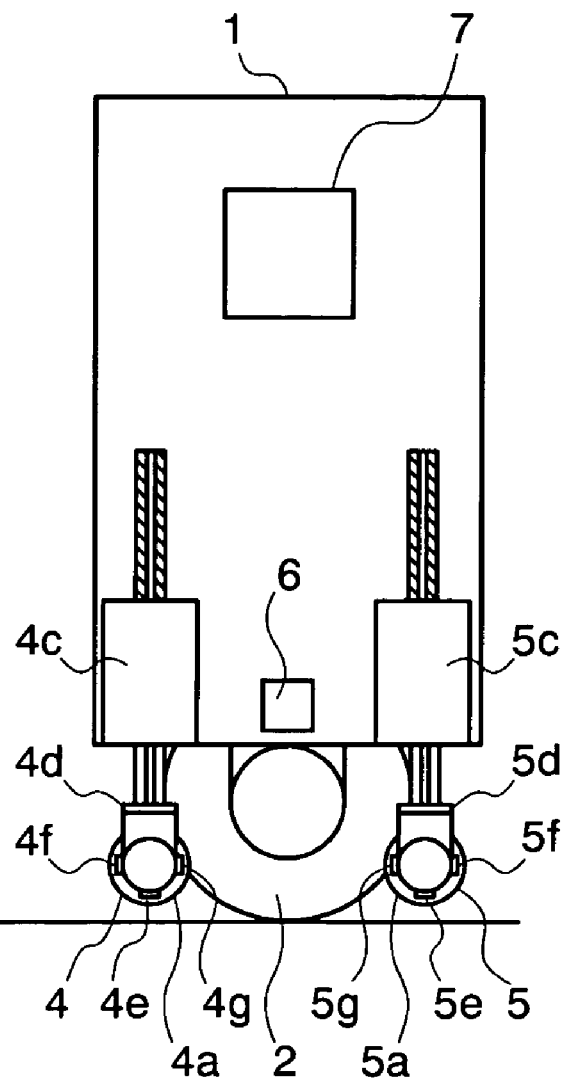
FIG.1(a) (FRONT VIEW)
FIG.1(b) (SIDE VIEW)

GROUND-CONTAC
SUPPORT CONDITION

INVERTED TWO-WHEELS
TRAVEL CONDITION

ANTI-TUMBLE
SUPPORT CONDITION:
THRUST SUPPORT LEG UPON
ABNORMAL INCLINATION

ANTI-TUMBLE CONDITION:
FIX SUPPORT LEGS VIA
CUT-OFF OF POWER SOURCE

INVERTED TWO-WHEELS
TRAVEL CONDITION

DEFECT LEVEL
DIFFERENCE

REAR SUPPORT POSTURE
OF GRAVITY-CENTER

CLIMB-UP TRAVEL

DETECT LEVEL
DIFFERENCE

SUPPORT VERTICAL
POSTURE

INVERTED TWO-WHEELS
TRAVEL CONDITION

DETECT RECESS:
INVERTED TWO-WHEELS
TRAVEL CONDITION

FRONT SUPPORT LEG
CONTACT GROUND

FRONT SUPPORT POSTURE
OF GRAVITY-CENTER

CLIMB-DOWN TRAVEL

DETECT PLANE

SUPPORT VERTICAL
POSTURE

INVERTED TWO-WHEELS
TRAVEL CONDITION

REAR SUPPORT POSTURE OF
GRAVITY-CENTER/
CLIMB-UP TRAVEL

FRONT SUPPORT-LEG DETECT
RECESS/REAR SUPPORT-LEG
DETECT LEVEL DIFFERENCE

MOVE GRAVITY-CENTER
FROM REAR TO FRONT

FRONT SUPPORT OF
GRAVITY-CENTER

FRONT SUPPORT OF
GRAVITY-CENTER/
CLIMB-DOWN TRAVEL

DETECT INCLINATION:
INVERTED TWO-WHEELS
TRAVEL CONDITION

REAR SUPPORT POSTURE
OF GRAVITY-CENTER

CLIMB-UP TRAVEL

DETECT PLANE

INVERTED TWO-WHEELS
TRAVEL CONDITION

DETECT RECESS:
INVERTED TWO-WHEELS
TRAVEL CONDITION

REAR SUPPORT POSTURE
OF GRAVITY-CENTER

CLIMB-UP TRAVEL

DETECT PLANE

INVERTED TWO-WHEELS
TRAVEL CONDITION

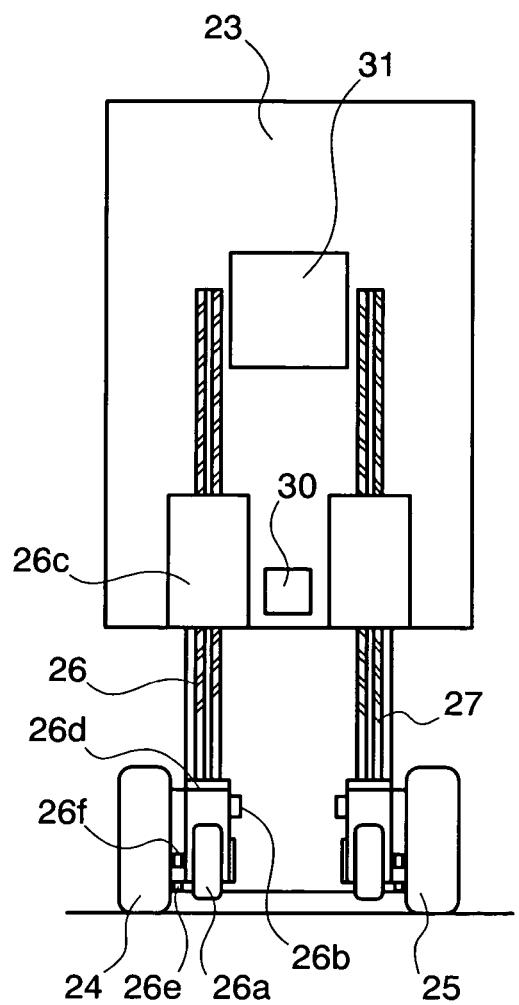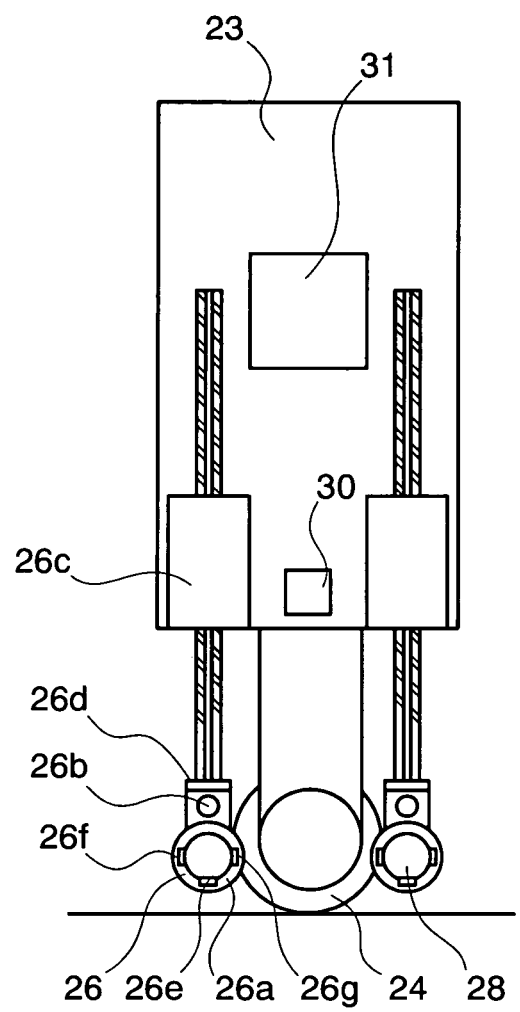
FIG.10(a) (FRONT VIEW)
FIG.10(b) (SIDE VIEW)

DETECT LEVEL DIFFERENCE/
INVERTED TWO-WHEELS
TRAVEL CONDITION

LIFT-UP FRONT
SUPPORT-LEG

SUPPORT ALL
SUPPORT-LEGS

LIFT-UP
DRIVE-WHEEL

DETECT LEVEL DIFFERENCE

INVERTED TWO-WHEELS
TRAVEL CONDITION (FRONT VIEW)

(SIDE VIEW)

INVERTED
TWO-WHEELS
STOP POSTURE

INVERTED
TWO-WHEELS
TRAVEL POSTURE

ANTI-TUMBLE
PREVENT
MOVEMENT

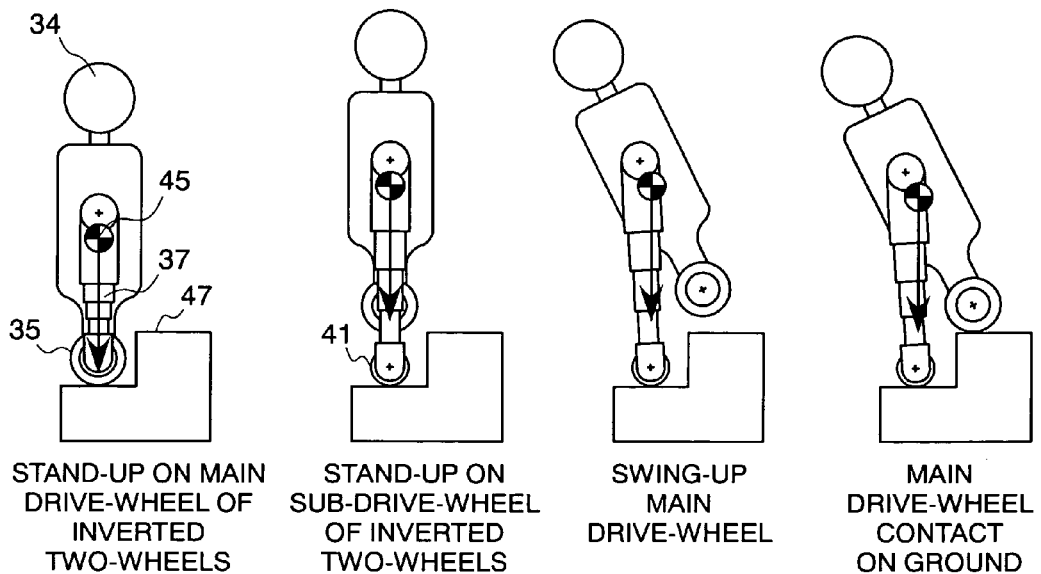
FIG.14(a) STAND-UP ON MAIN DRIVE-WHEEL OF INVERTED TWO-WHEELS
FIG.14(b) STAND-UP ON SUB-DRIVE-WHEEL OF INVERTED TWO-WHEELS
FIG.14(c) SWING-UP MAIN DRIVE-WHEEL
FIG.14(d) MAIN DRIVE-WHEEL CONTACT ON GROUND
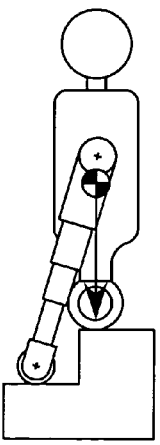
FIG.14(e) MOVE GRAVITY-CENTER ON MAIN DRIVE-WHEEL
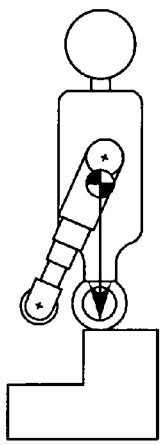
FIG.14(f) STAND-UP ON MAIN DRIVE-WHEEL OF INVERTED TWO-WHEELS
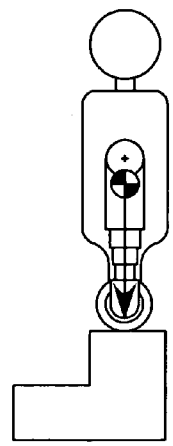
FIG.14(g) END CLIMB-UP

FALL-DOWN CONDITION

LIFT-UP UPPER-BODY BY ARM

THRUST-OUT OF SUPPORT-LEG

LIFT-UP UPPER-BODY BY SUPPORT-LEG

END RECOVERY FROM FALL-DOWN

MOVING ROBOT

BACKGROUND OF THE INVENTION

The present invention relates to a moving robot, being able to operate under an environment of coexistence with a human being.

In case when considering the forms of workings or operations with an aid of a robot, under the environment or circumstances coexisting with a human being, into the consideration, it is rational that a height of the robot be nearly equal to the size of the human being, for conducting hand works and interaction to the human being effectively. Further, in case when the robot conducts works within a limited space where it coexists with the human being, accompanying effective movements thereof, it is preferable to minimize a footprint of the robot at the smallest as possible. When achieving such requirements of the forms, a gravity center of the robot necessarily comes to be high, with respect to the footprint, and thereby lowering a stability of standing posture thereof. On the other hand, in case of letting it to conduct the practical works, the robot is required to have ability to move quickly and safely. This requirement, however, is conflicting to the high-position of the gravity center thereof. From such the requirements, as be mentioned in the following Patent Documents 1 and 2, for example, there are proposed a mechanism of the coaxial two-wheels mechanism of controlling driving force into a direction of forward drive, by means of the inverted pendulum control. In this mechanism of applying the coaxial two-wheels mechanism having footprints being narrow in width thereof, the coaxial two-wheels mechanism is made standing stably through a dynamic posture control, though having an unstable static moving characteristics of the inverted pendulum, and thereby enabling a stable and quick acceleration/deceleration movement with shifting the gravity center thereof.

Patent Document 1: Japanese Patent Laying-Open No. 2003-271243 (2003); and

Patent Document 2: Japanese Patent No. 2,530,652.

BRIEF SUMMARY OF THE INVENTION

Although the conventional arts disclosed in the above-mentioned Patent Documents 1 and 2 can provide stability for the robot to run on a flat or level surface, however no consideration was paid on a countermeasure for preventing the robot from an event of falling down due to un-expectable reasons. Nor no consideration was paid on a measure for maintaining availability of traveling and also stability of traveling, under the circumstances of existing difference in level, i.e., steps therein. The problem of the former, inherently accompanying the travel based on the inverted pendulum control, is caused due to an abnormal operation of the travel controlling system, or cutoff of an electric power source, so that the robot looses the balancing operation force of the moving mechanism, and thereby resulting into falling down, easily. For achieving practical application thereof, actually, there is necessity of providing a means for protecting the robot from falling down at an opportunity when detecting the reasons of causing such the falling down or tumbling. Relating to an adaptability or flexibility to the traveling circumstances, being the problem of the latter mentioned above, the traveling is possible upon basis of the inverted pendulum control if the difference in level is concave and convex or steps, and/or an inclined plane-surface, being sufficiently low in height thereof and/or gentle in inclination thereof, with respect to a diameter of driving wheels. However, for traveling on an edge of a road or steps, which can be expected in the practical application thereof, since the driving wheels must be very large, in the diameter thereof, then the footprint of the robot itself is expanded or enlarged, undesirably, and thereby loosing an inherent merit or advantage obtainable by applying the inverted pendulum control.

An object, according to the present invention, is to provide a moving robot, enabling to prevent itself from falling down or tumbling when traveling and travel with stability even under the circumstances of including the steps and the inclined-surfaces lying therein, as well as, being narrow in the footprints; thereby being suitable for working together with a human being.

(1) The object according to the present invention is accomplished by a moving robot, comprising: a moving mechanism of coaxial two-wheels type, having a pair of main driving wheels, for controlling driving force into a forward moving direction through an inverted pendulum control; and a supporting leg, having at least one or more of an auxiliary wheel, wherein a relative position of said auxiliary wheel is changeable with respect to the main driving wheels of said moving mechanism.

(2) The object according to the present invention is accomplished by the structures as described in the (1), wherein said supporting legs are disposed in front and rear of the main driving wheels of said moving mechanism in the forward moving direction thereof, each being able to elevate the auxiliary wheel up and down with respect to a traveling surface.

(3) The object according to the present invention is accomplished by the structures as described in the (1), the moving robot, as described in the (1), wherein said auxiliary wheel is a follower type wheel.

(4) The object according to the present invention is accomplished by the structures described in the (2), wherein said auxiliary wheel is a follower type wheel.

(5) The object according to the present invention is accomplished by the structures described in the (4), wherein said auxiliary wheel has a steering circling drive mechanism.

(6) The object according to the present invention is accomplished by the structures described in the (1), wherein said supporting leg comprises a rotating mechanism of being able to move said auxiliary wheel, pivotally, into the driving direction with respect to said moving mechanism, and a thrusting mechanism of being able to control a distance from a rotation center of said rotating mechanism to said auxiliary wheel.

(7) The object according to the present invention is accomplished by the structures described in the (6), wherein said auxiliary wheel is made of a follower type wheel, and further has a means for controlling a driving force into a forward moving direction through the inverted pendulum control, in a similar manner to that of said main driving wheels.

(8) The object according to the present invention is accomplished by the structures described in the (7), wherein said auxiliary wheel has a steering circling drive mechanism.

(9) The object according to the present invention is accomplished by the structures described in the (1), further comprising a means for measuring a relative distance between a tip of said supporting leg and a traveling surface, and a means for controlling positioning of said supporting leg so as to maintain it to be a predetermined relative distance.

(10) The object according to the present invention is accomplished by the structures described in the (1), further comprising a means, brining said at least one supporting leg to be in contact on a driving surface on a ground, and for controlling a thrusting position of said supporting leg being in contact on the ground, so as to maintain a projection position of gravity within an area, which is defined through connecting a point of said supporting leg contacting on the ground and points of said main driving wheels contacting on the ground.

(11) The object according to the present invention is accomplished by the structures described in the (9), wherein said supporting leg is fixed in position thereof, when an abnormality occurs within a control system, or when an electric power source is cut off, or when said moving robot is inclined in posture thereof, to be equal or greater than an allowable value thereof, under a condition of driving said main driving wheels upon basis of said inverted pendulum control.

(12) The object according to the present invention is accomplished by the structures described in the (9), further comprising a control means for thrusting out said supporting leg in a fall-down direction of said moving robot, so as to recover said moving robot from the fall-down posture thereof, when an abnormality occurs within a control system, or when an electric power source is cut off, or when said moving robot is inclined in posture thereof, to be equal or greater than an allowable value thereof, under a condition of driving said main driving wheels upon basis of said inverted pendulum control.

(13) The object according to the present invention is accomplished by the structures described in the (12), further comprising an emergency electric power source other than said electric power source, wherein driving control of said supporting leg is conducted for anti-tumbling thereof through said emergency electric power source.

(14) The object according to the present invention is accomplished by the structures described in the (10), wherein assumption is made on an inclination angle of the traveling surface from an amount of thrusting said supporting leg to be in contact on the ground and a posture angle of said moving robot inclined, and determination is made that the traveling surface is a plane surface in case when the inclination angle of the traveling surface is less than a predetermined value, so as to initiate said inverted pendulum control on said main driving wheels.

According to the present invention, as was mentioned above in details thereof, for the robot traveling on the coaxial two-wheels mechanism, traveling with using the inverted pendulum control, it is possible to prevent the robot from falling down during the traveling thereof, and also by diverting a mechanism function to be a means for anti-tumbling, it is possible to provide the moving robot, enabling a stable travel under a traveling circumstances where level differences and inclined surfaces exist therein, as well as, being narrow in the footprint thereof, and therefore being suitable for the operates under an environment of coexistence with a human being.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIGS. 1(a) and 1(b) are the views for showing the structure of a mechanism of the moving robot, according to one embodiment of the present invention;

FIGS. 10(a) and 10(b) are the views for showing the structure of a mechanism of the moving robot, according to other embodiment of the present invention;

FIGS. 14(a) to 14(g) are the views for explaining an operation of traveling on steps in the moving robot, according to the further other embodiment of the present invention.

DETAILED DESCRIPTION OF THE INVENTION

Hereinafter, embodiments according to the present invention will be fully explained by referring to the attached FIGS. 1(a) to 9(e). The moving robot, according to the present embodiments, comprises a moving mechanism of coaxial two-wheels type, having a pair of main driving wheels, for controlling driving force into a forward moving direction through an inverted pendulum control, and further supporting legs in front and rear of the moving mechanism, each of which has auxiliary wheels at a tip thereof and is elevated up and down in the vertical direction, and a controller means thereof. At the tip of the supporting leg is disposed a sensor for measuring the distance between the floor surface, wherein the robot makes control so that a gap between the tip of the supporting leg and the floor is maintained at a constant when running through the inverted two-wheels travel, in order to maintain quickness of inverted two-wheels travel, while preventing itself from falling down, by thrusting out the supporting leg into a direction for recovering from the fall-down or mechanically fixing the position of the auxiliary wheels, when detecting abnormal control within the controller means or when cut-off occurs within an electric power source. Further, at the tip of the supporting leg is disposed a sensor for measuring the distance between a side surface of the supporting leg and a projection on the floor surface, for detecting an existence and/or the relative distance of a level difference and/or a steep inclination upon this information, so as to retract the supporting leg from the level difference lying in the moving direction or bring the supporting leg at an opposite direction thereof to contact on the ground; thereby maintaining a gravity center of the moving robot within a space defined between the driving wheels and the provided auxiliary wheels of the supporting leg, stably, and enabling climbing up and down on the level difference and also traveling on the inclination.

Embodiments

Hereinafter, explanation will be given about embodiments according to the present invention, by referring to FIGS. 1(a) to 9(e) of the drawings attached herewith.

Figure 2:
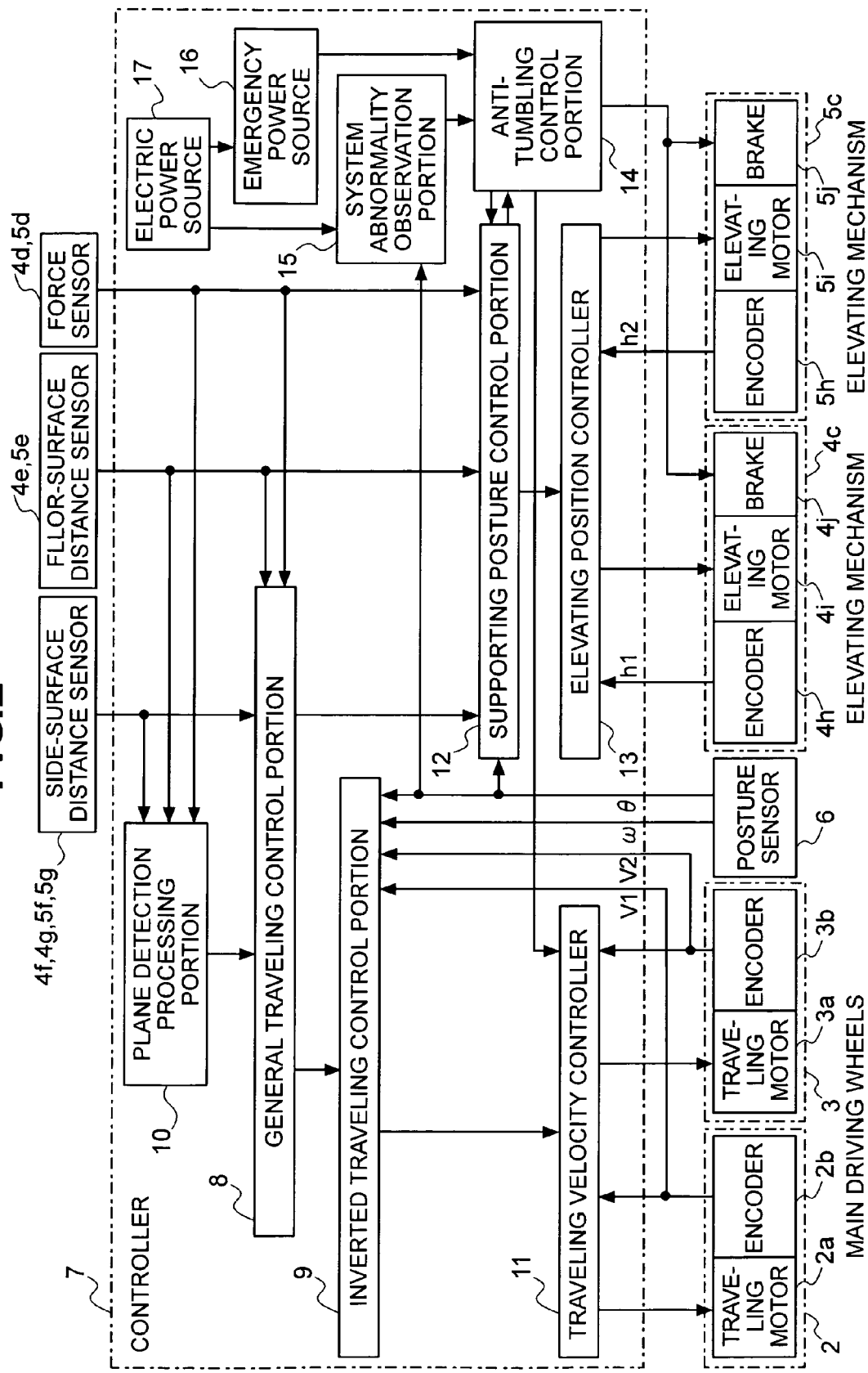
FIG. 2 is a block diagram for showing the structure of a controller system of the moving robot, according to the embodiment of the present invention.

FIGS. 1(a) and 1(b) are a front view and a side view of the moving robot, according to the present embodiment, for explaining the mechanical structures thereof. FIG. 2 is the block diagram of the controlling system of the moving robot, according to the present embodiment. In those FIGS. 1(a) to 2, the similar constituent elements are given with the same reference numbers.

The moving robot 1 comprises main driving wheels 2 and 3, each of which is controlled in accordance with the inverted pendulum control, supporting legs 4 and 5, which are disposed in front and rear of those main driving wheels 2 and 3, a posture sensor 6 for detecting posture of the moving robot with respect to the direction of gravity, and a controller apparatus 7 for controlling the mechanisms of the moving robot 1, upon basis of information from the posture sensor 6, etc.

At a tip of each of the supporting legs 4 are provided auxiliary wheels 4a and 4b, being made of following wheels, and each of those auxiliary wheels 4a and 4b elevates up and down by means of an elevating mechanism 4c. As such elevating mechanism 4c, a ball-spline mechanism is applicable, for example. Of course, it is apparent that the same effect can be obtained, even if applying other mechanism/means thereto, but as far as it enable to elevate those auxiliary wheels 4a and 4b. Within a driving means of the elevating mechanism 4c is installed an OFF brake 4j (see FIG. 2), wherein the elevating position thereof is fasten or fixed, mechanically, when cutoff occurs on an electric power source. Further, at the tip of the supporting leg 4 are provided a force sensor 4d for detecting a contacting counter force applying onto the auxiliary wheels 4a and 4b, a floor distance sensor 4e for measuring a gap between the tip of the supporting leg 4 and the traveling surface, and side-surface distance sensors 4f and 4g, each for measuring a relative distance between the structure on the floor surface and the supporting leg 4, respectively.

The structures of the supporting leg 5, which is provided in rear of the main driving wheels 2 and 3, are same to those of the supporting leg 4, comprising therein auxiliary wheels 5a and 5b, an elevating mechanism 5c, a force sensor 5d, a floor-surface distance sensor 5e, and side-surface distance sensors 5f and 5g.

Next, explanation will be given about the structures of the controlling system of the moving robot, by referring to FIG. 2. A traveling velocity controller 11 is connected to traveling motors 2a and 3a, which are installed within the main driving wheels 2 and 3, respectively, and also to encoders 2b and 3b, whereby achieving feedback controls on traveling velocity upon basis of the respective velocity instruction values for the main driving wheels 2 and 3, which are generated from an inverted traveling control portion 9. This inverted traveling control portion 9 produces the velocity instruction values for the main driving wheels 2 and 3, respectively, upon basis a controlling rule of inverted two-wheels travel, in accordance with a target value of difference between the main traveling wheels 2 and 3, and a target value of traveling velocity for the moving robot 1, which are generated from a general traveling control portion 8. The controlling rule of inverted two-wheels travel is as follows, for example:

$$V\text{run} = Vr - (V1+V2)/2 - K1^*\theta - K2^*\omega \quad (1)$$

$$V1r = \Delta Vr/2 + V\text{run} \quad (2)$$

$$V2r = \Delta Vr/2 - V\text{run} \quad (3)$$

Where, "V1r" and "V2r" are velocity instruction values of the main driving wheels 2 and 3, which are outputted to a traveling velocity controller 11. Further "Vr" and "ΔVr" are target values of the traveling velocity and of the difference in velocity, respectively, which are generated from the general traveling control portion 8. And further, "V1 and V2" are the traveling velocities of the main driving wheels 2 and 3, which are detected by means of the encoders 2b and 3b. Furthermore, "θ" and "ω" are a posture angle of the robot and an angular velocity thereof, in the direction of drive with respect to the direction of gravity, which are detected by means of the posture sensor 6. "K1" and "K2" are feedback functions for the inverted two-wheels traveling control.

By setting the "K1" and "K2" of the equation (1) appropriately, an averaged velocity of the main driving wheels 2 and 3 travel following the target value of traveling, and at the same time such control is executed that the "θ" and "ω" comes to be near to zero (0). Thus, the robot can travel in the posture of standing inversely on two (2) wheels. At the same time, the difference in velocity between the main driving wheels 2 and 3 is determined, in the equations (2) and (3), being proportional to "ΔVr"; thereby enabling a circling travel depending on "ΔVr". Further, during the traveling under the condition of contacting the supporting legs 4 and 5 on the ground, which will be mentioned later, the inverted two-wheels traveling control can be cancelled or released, through changing setup of the "K1" and "K2" into zero (0).

The elevator motors 4i and 5i provided within the elevating mechanisms 4c and 5c, being controlled by means of an elevating position controller 13, positions the supporting legs 4 and 5, the positions of which are detected by the encoders 4h and 5h, at predetermined heights with using the feedback control. The brakes 4j and 5j provided within the elevating mechanisms 4c and 5c fix the positions of the supporting legs 4 and 5, mechanically, when the driving electric power is cut off, or upon an instruction from an anti-tumbling control portion 14.

A support posture control portion 12 produces elevation control values of the supporting legs 4 and 5, for the elevating position controller 13. The support posture control portion 12 has four (4) control functions. A fist control function is a following function of maintaining the relative distance between the tip of the supporting leg 4 or 5, or the traveling surface or the projected surface, such as, the difference in level, etc., at a predetermined value. This control function can be achieved by setting an upper limit of an amount of thrust of the supporting leg 4 or 5 at the tip thereof, upon basis of the information relating to the relative distance between the tip of the supporting leg 4 or 5, or the traveling surface or the projected surface, such as, the difference in level, etc., which can be obtained from the floor distance sensors 4e or 5e. Also, this function can be achieved by further setting the upper limit of the amount of thrust of the supporting leg 4 or 5 at the tip thereof, with respect to contacting on the road surface configuration, which cannot be grasped by means of the floor distance sensor 4e or 5e, upon basis of the information of contact reaction applied onto the auxiliary wheels 4a and 4b or 5a and 5b, obtainable from the force sensors 4d and 5d. A second control function is that of gravity center supporting posture control. This function is for maintaining a projected position of the gravity center of the moving robot 1 to be within a stable area defined by three (3) points, which can be determined by the three (3) points of the tips of, i.e., the main driving wheels 2 and 3 and either one of the thrusting supporting leg 4 or 5, when the moving robot 1 thrusts the supporting leg 4 or 5 under the condition of canceling or relief of the inverted two-wheels traveling control, and thereby keeping a stable stability in posture of the moving robot 1. This function can be achieved by controlling the supporting leg 4 or 5, which is in contact on the ground, so that the posture angle "θ" detected by the posture sensor 6 follows a predetermined target value thereof, while inclining the moving robot 1 into the direction of the supporting leg 4 or 5, which is in contact on the ground. Under the condition of executing that second control function, the traveling is made by contacting either one of the supporting leg 4 or 5, while floating the other supporting leg 4 or 5, not contacting on the ground, from the traveling surface through the first control function. A third control function is that of all-legs grounding posture control. This function is to be used in case where making the moving robot 1 standing up with stability, while bringing it into a suspending or standstill condition thereof, and in the case when executing this second control function, it is used to be a transition operation when exchanging the grounding thereof between the supporting legs 4 and 5 while shifting the gravity center of the robot. Under the condition of the inverted two-wheels traveling control, although the predetermined gap is maintained between the tip of the supporting leg 4 or 5 and the traveling surface through the first function, however in case when shifting into this function, the target value of the gap is brought to be close to zero (0), and the supporting leg 4 or 5 is stopped from thrusting at a time point when detecting contact on the ground from the reaction of the supporting leg 4 or 5, and thereby canceling or relief of the inverted two-wheels traveling control. When trying to shift the gravity center of the robot, thrusting and retracting of the supporting legs 4 and 5 are controlled in the positions thereof while linking them with each other, so that the main driving wheel 2 and 3 will never float from the traveling surface. A fourth control function is that of fixing of the supporting legs. In this function, while holding the positioning of the supporting legs 4 and 5 at the present positions, the brakes 4j and 5j are turned into effective through the anti-tumbling control portion 14, so as to fix the supporting legs 4 and 5, mechanically. This function is to be used when letting the moving robot 1 standing up while bringing it into the standstill condition thereof. When activating this function, since the supporting legs 4 and 5 are fixed in the position thereof by means of the brakes of an electric power cutoff, it is possible to bring the robot into waiting condition in an energy saving state of cutting off all the driving electric power of the supporting legs 4 and 5 and the main driving wheels 2 and 3. Also, this function is initiated by means of the anti-tumbling control portion 14 when a possibility of falling down of the moving robot is determined within the anti-tumbling control portion 14, and supports the moving robot 1 so as to prevent it from falling down, by fixing the supporting legs 4 and 5, mechanically.

Figure 3:
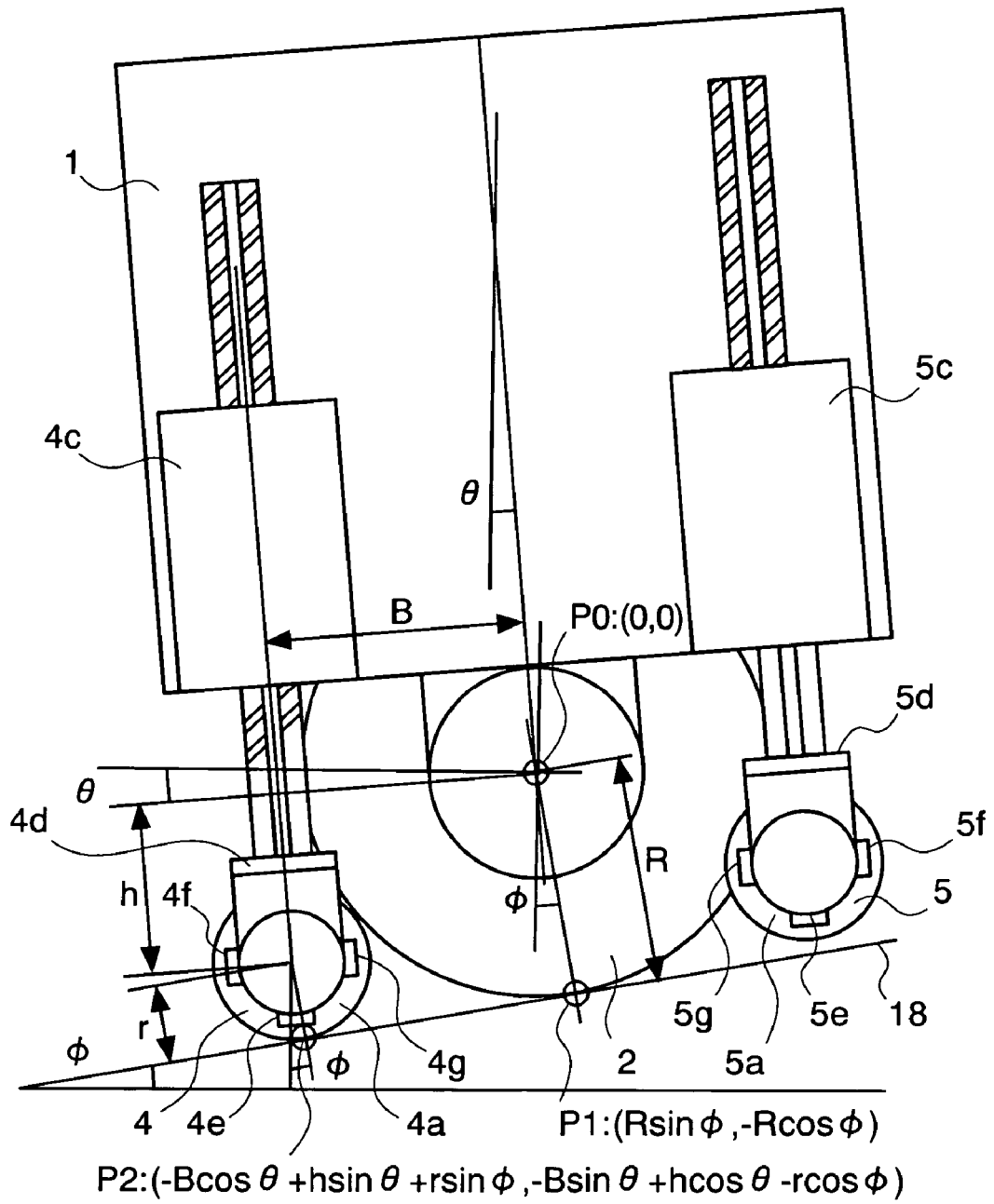
FIG. 3 is a view for explaining a plane-surface detection calculation within the moving robot, according to the embodiment of the present invention.

The general traveling control portion 8 gives instructions to the inverted traveling control portion 9 and the support posture control portion 12, so as to execute control on an entire of traveling movements. Thus, the general traveling control portion 8 executes traveling control in conformity with the environment, by using the inverted two-wheels travel upon the mutual position information between the supporting leg 4 or 5 and the traveling circumstances, which are detected by the side distance sensors 4f and 4g, and 5f and 5g, the floor-surface distance sensors 4e and 5e, and the force sensors 4d and 5d, and grounding support with an aid of the supporting legs 4 and 5, well as. Decision of conducting the inverted two-wheels travel is made upon a result of processing of a plane-surface detect processing portion 10. FIG. 3 shows a calculation model for calculating out an inclination of an equivalent traveling surface, which will be conducted within the plane-surface detect processing portion 10. In FIG. 3, in case of assuming that the coordinates of center of the main driving wheels 2 and 3 are (0,0), the coordinates of a contact point "P1" between the main driving wheels 2 and 3 and the traveling surface 18 are (R sin φ,−R cos φ), while the coordinates of a contact point "P2" between the auxiliary wheel 4a and the traveling surface 18 (−B cos θ+h sin θ+r sin φ,−B sin θ+h cos θ−r cos φ). From this relationship, the inclination angle "φ" of the traveling surface 18 can be calculated out, as below:

$$\phi = \tan^{-1}((R-r)\sin\phi + B\cos\theta - h\sin\theta)/((r-R)\cos\phi + B\sin\theta - h\cos\theta) \quad (4)$$

where, "R" is a radius of the main driving wheels, "r" a radius of the auxiliary wheel 4a, "θ" the inclination angle of the moving robot 1, "h" a thrust distance of the auxiliary wheel 4a of the supporting wheels 4 under the condition of being in contact on the ground upon the basis of the center of the main driving wheels 2 and 3, and "B" an axial distance between the center of the main driving wheels 2 and 3 and the center of the auxiliary wheel 4a, in the horizontal direction. Herein, "h" can be detected by means of the floor distance sensors 4e. In case when the inclination angle "φ" of the traveling surface 18, which can be assumed within the plane-surface detect processing portion 10, is equal or less than a predetermined value, then the general traveling control portion 8 gives an instruction of conducting the inverted two-wheels travel to the inverted traveling control portion 9, while an instruction of conducting the first control function to the support posture control portion 12. In case when finding out a projection on the traveling surface 18 with an aid of the side-surface distance sensors 4f and 4g, it gives an instruction of conducting the third function, first, to the inverted traveling control portion 9, while conducting relief of the inverted two-wheels travel, and then generates traveling sequences in conformity with the traveling circumstances, which will be mentioned later. A system abnormality observation portion 15 determines health of control hardware building up the controller 7, while determining on whether the posture angle "θ" of the moving robot 1, which can be detected by the posture sensor 6, exceeds or not an allowable limit value, and it determines on whether an output of the electric power portion is in normal or not, further. Combining or integrating those determinations together with, if making an expectation of falling-down of the moving robot 1 therein, it gives an emergency stoppage instruction to the anti-tumbling control portion 14, and then the anti-tumbling control portion 14 provides that emergency stoppage instruction to the traveling velocity controller 11. Further, the anti-tumbling control portion 14 instructs the third control function to the support posture control portion 12, when the demand of emergency stoppage instruction is caused due to the fact that the posture angle "θ" exceeds the limit thereof, so as to let the supporting leg 4 or 5 lying into the direction of fall-down to thrust, thereby generating movement of recovering the posture from being inclined extremely into the fall-down thereof. On the other hand, to the other demand of emergency stoppage caused due to the factors other than that, assuming that any problem occurs in the controlling system, it maintains the thrust positions of the supporting legs 4 and 5 at the present values thereof, and further cuts off the electric power source of the brakes 4j and 5j, so as to fix the positions of the supporting legs 4 and 5, mechanically; thereby conducting anti-tumbling operation. An emergency electric power source portion 16, for temporally holding therein electricity supplied from the electric power source 17, supplies the electricity to the anti-tumbling control portion 14 when the entire of the controller 7 is down due to abnormality of the electric power source 17, thereby allowing it to complete the processes for emergency stoppage.

Next, explanation will be made on the operation of the present embodiment, by referring to FIGS. 4(a) to 9(e).

Figure 4A:
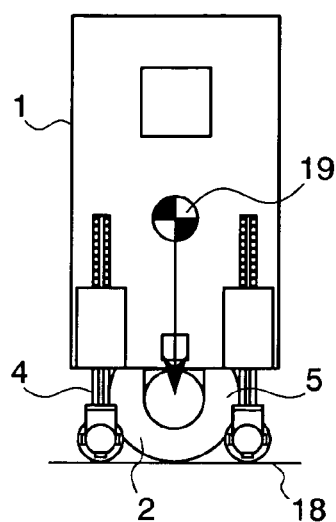
FIGS. 4(a) to 4(d) are the views for explaining an anti-tumbling operation in the moving robot, according to the embodiment of the present invention.
Figure 4B:
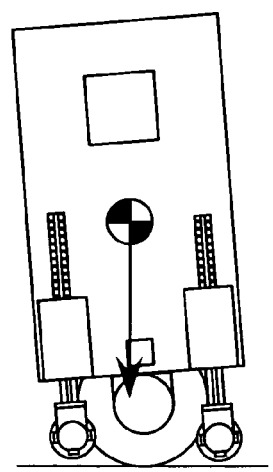
Figure 4C:
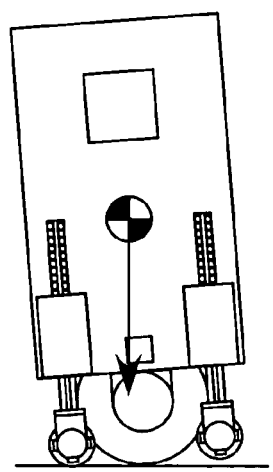

FIGS. 4(a) to 4(e) show the states of the moving robot 1 changing the traveling condition thereof, in particular, with respect to that of the inverted two-wheels travel shown in FIG. 4(b). The moving robot 1, conducting the third and fourth control function when being stopped to be in the standstill condition thereof, as is shown FIG. 4(a), brings the supporting legs 4 and 5 to be in contact on the traveling surface, to be in a mechanically fixed condition; i.e., being stopped in the standing posture being statically safe. FIG. 4(c) shows the situation of thrusting the supporting leg 4, for preventing the robot from falling down into the moving direction, during the inverted two-wheels travel shown in FIG. 4(b), as being a process when the posture angle exceeds the limit value.

Figure 4D:
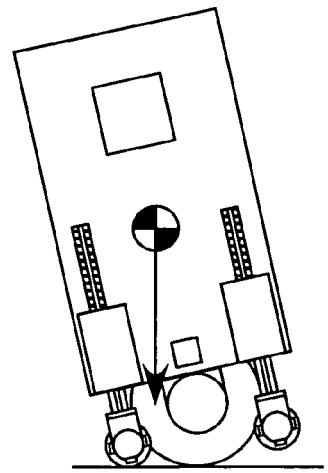

FIG. 4(d) shows the situation of keeping the supporting leg 4 at the position when the electric power is cut off, with an aid of the brakes 4j and 5j, so as to prevent the robot from falling down, in particular, when the electric power is cut off due to travel within the electric power source portion 17 during the inverted two-wheels travel shown in FIG. 4(b).

Figure 5A:
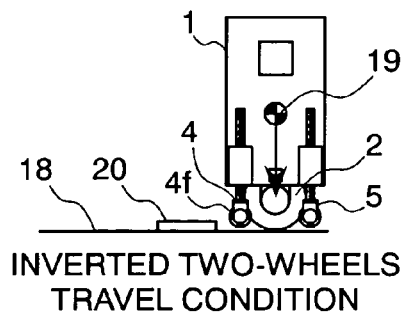
FIGS. 5(a) to 5(g) are the views for explaining an operation of traveling on a step in the moving robot, according to the embodiment of the present invention.
Figure 5B:
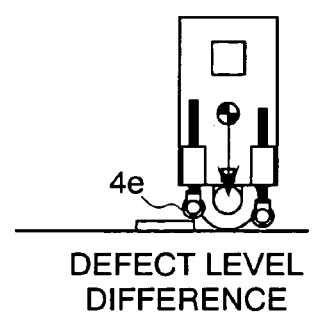
Figure 5C:
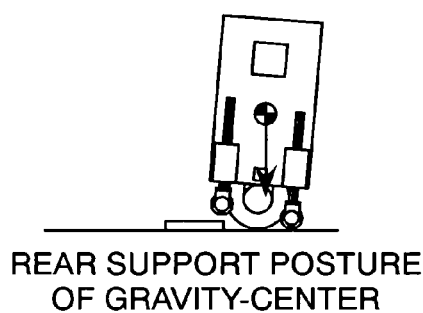
Figure 5D:
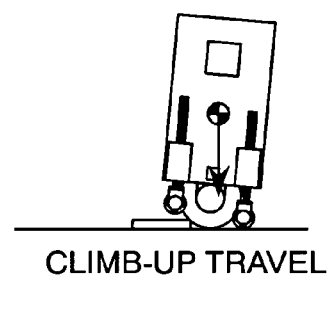
Figure 5E:
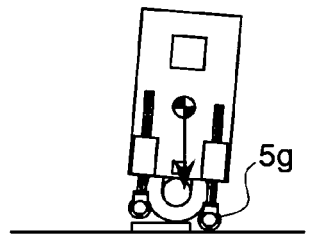
Figure 5F:
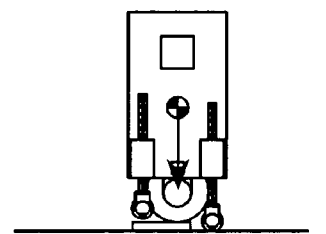
Figure 5G:
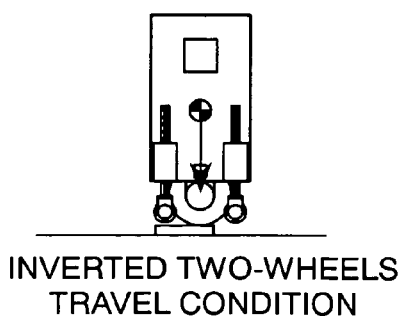
Figure 6A:
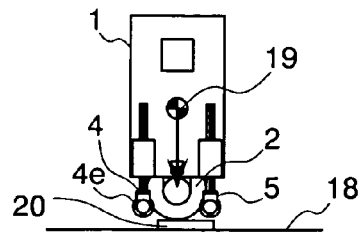
FIGS. 6(a) to 6(g) are the views for explaining an operation of traveling on a step in the moving robot, according to the embodiment of the present invention.
Figure 6B:
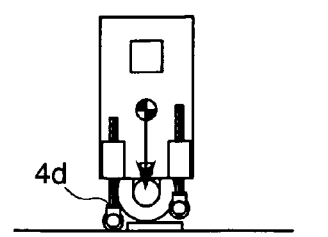
Figure 6C:
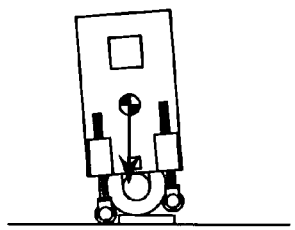
Figure 6D:
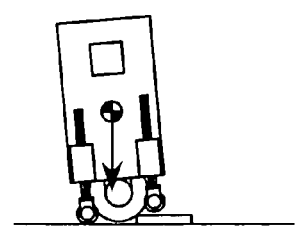
Figure 6E:
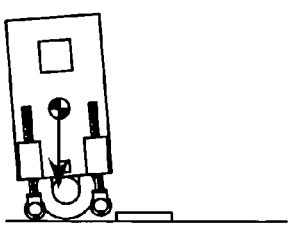
Figure 6F:
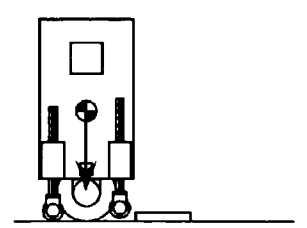
Figure 6G:
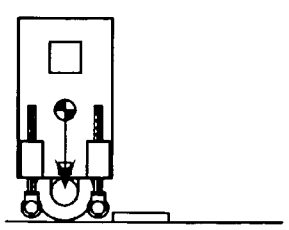
Figure 7A:
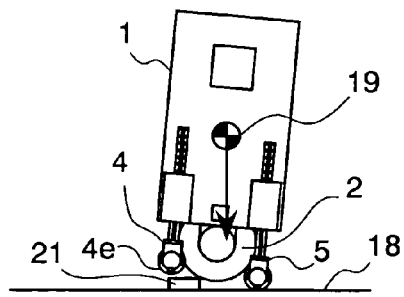
FIGS. 7(a) to 7(e) are the views for explaining an operation of traveling on a bump in the moving robot, according to the embodiment of the present invention.
Figure 7B:
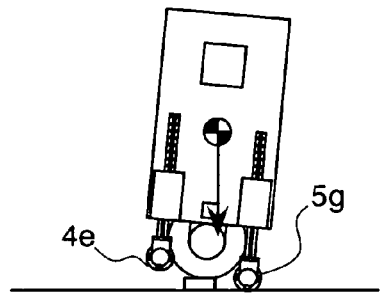
Figure 7C:
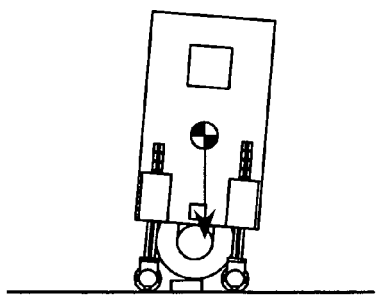
Figure 7D:
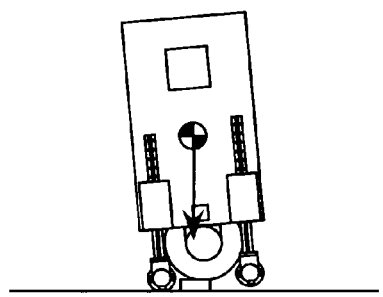
Figure 7E:
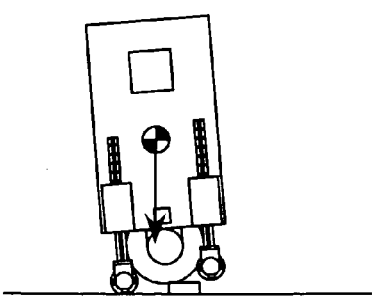
Figure 8A:
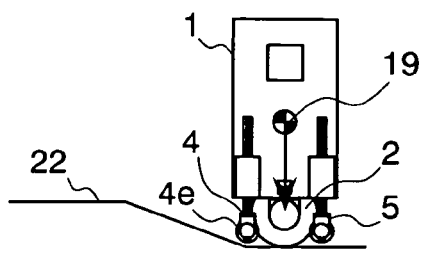
FIGS. 8(a) to 8(e) are the views for explaining an operation of traveling on an inclined surface in the moving robot, according to the embodiment of the present invention.
Figure 8B:
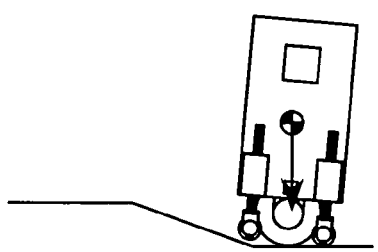
Figure 8C:
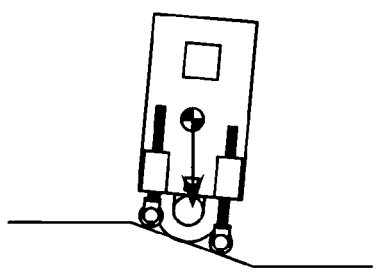
Figure 8D:
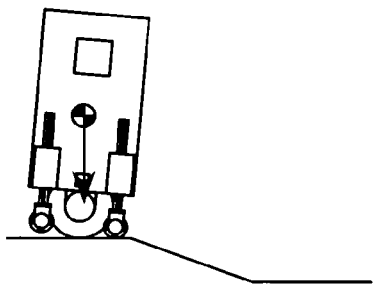
Figure 8E:
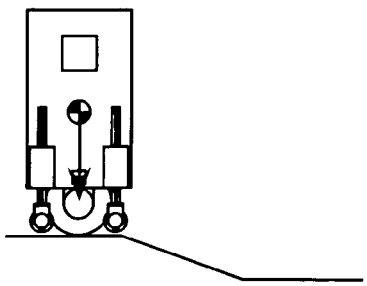
Figure 9A:
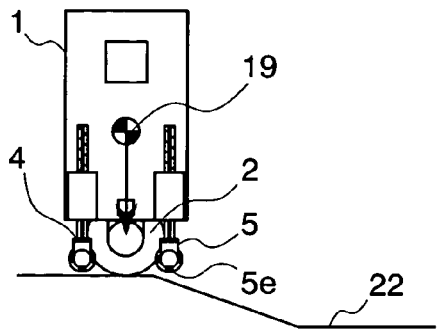
FIGS. 9(a) to 9(e) are the views for explaining an operation of traveling on an inclined surface in the moving robot, according to the embodiment of the present invention.
Figure 9B:
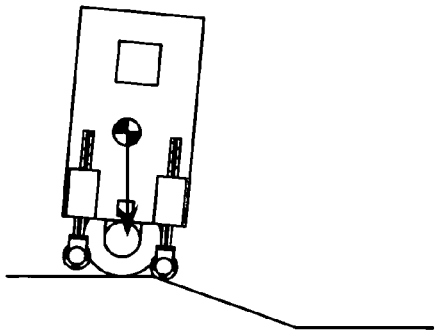
Figure 9C:
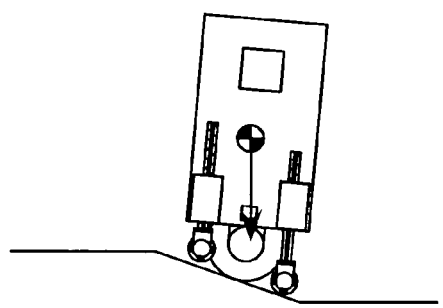
Figure 9D:
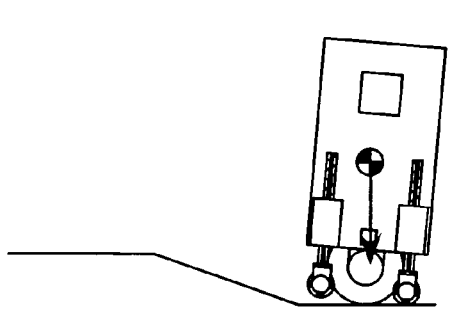
Figure 9E:
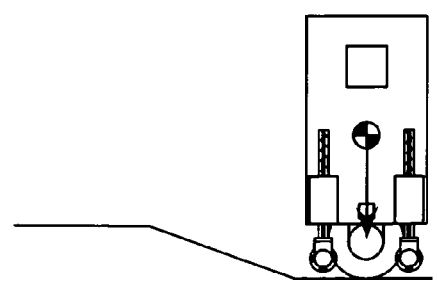
Figure 11A:
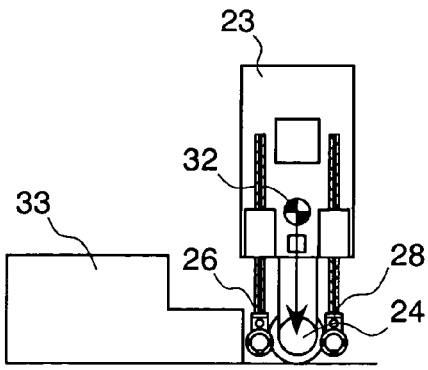
FIGS. 11(a) to 11(f) are the views for explaining an operation of traveling on steps in the moving robot, according to the embodiment of the present invention.
Figure 11B:
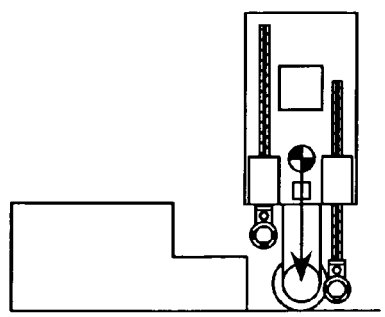
Figure 11C:
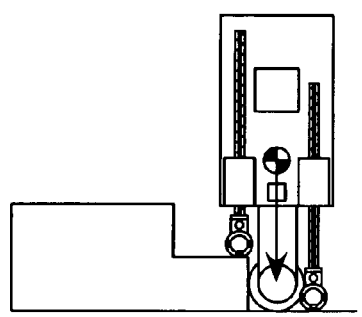
Figure 11D:
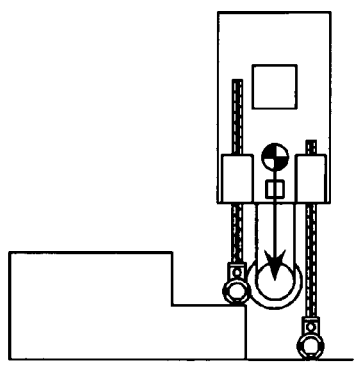
Figure 11E:
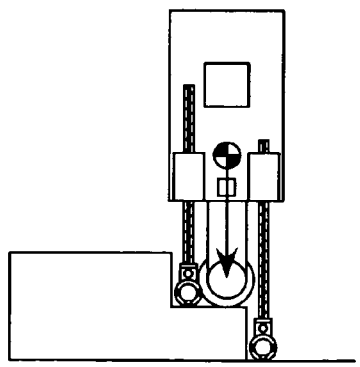
Figure 11F:
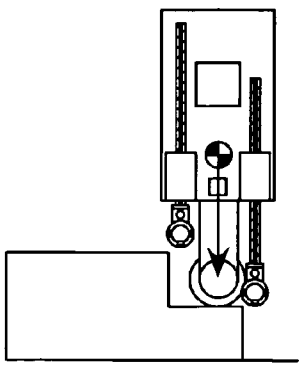

FIGS. 5(a) to 6(g) show the operation sequences for the moving robot 1 to climb up and down the level difference 20, respectively. In the climb-up sequences, as is shown in FIGS. 5(a) to 5(g), the robot approaches to the level difference 20 under the inverted two-wheels traveling condition as shown in FIG. 5(a), and detect that level difference 20 in the moving direction thereof, by means of the side-surface distance sensor 4f. Then, as is shown in FIG. 5(b), the robot rises up the supporting leg 4, escaping from the contact between the supporting leg 4 and the level difference 20, and detects passage of an end surface of the level difference 20 by means of the floor distance sensor 4e. Herein, as is shown in FIG. 5(c), releasing the inverted two-wheels traveling condition, the robot brings the supporting leg 5 to contact on the ground through the second control function; thereby keeping the static stability thereof. Moving forwards in this condition, and as is sown in FIG. 5(d), the robot runs on the level difference 20 with an aid of driving toque of the main driving wheels 2 and 3. Next, as is shown in FIG. 5(e), determining that the main driving wheels 2 and 3 are on an upper surface of the level difference 20 at the time point when detecting the end surface of the level difference 20 by the side distance sensor 5f, the moving robot 1 stands up in the posture thereof, with use of driving of the supporting leg 5 by the second control function, and after obtaining stabilization in the posture thereof through the third control function, it shifts into the inverted two-wheels travel, as is shown in FIG. 5(g). In the climbing-down sequences, as is shown in FIGS. 6(a) to 6(g), firstly the robot runs on the level difference 20 with the inverted two-wheels travel, and as is shown in FIG. 6(a), it detects a terminal edge of the level difference 20 by the floor distance sensor 4e, and it bring the supporting leg 4 to touch down on the traveling surface 18, as is shown in FIG. 6(b), at the time point when it moves in such degree that the auxiliary wheel 4a can land thereon. This series of operations are achieved by the first and the third control functions. Thereafter, as is shown in FIGS. 6 (c) to 6(d), by the second control function, the moving robot 1 climbs down the level difference 20, while supporting the gravity center 19 of itself by the supporting leg 4, stably. Thereafter, as is shown in FIG. 6(e), at the time pint when completing the plane surface detection on the traveling surface 18, the robot changes the traveling mode thereof, from the gravity-center supporting travel obtained through the second control function into the inverted two-wheel travel. FIGS. 7(a) to 7(e) show the sequences of climbing up and down when the robot travels on a level difference 21, being shorter than that shown in FIGS. (a) to 7(e), in width in depth thereof. In this example, the width of the level difference 21 is equal or less than the size "B", which is shown in FIG. 3 briefly, and detection by the floor distance sensor 4e is already completed upon the edge portion of the level difference 21 at the time point when the main driving wheels 2 and 3 runs on the level difference 21; i.e., the case where it is desirable to escape from a risk accompanying the inverted two-wheels travel on the narrow-width level difference. In FIG. 7(a), at an opportunity that the main driving wheels run on the level difference 21 through the processes similar to those shown up to FIG. 5(d), and in FIG. 7(b), that the floor-surface distance sensor 4e detects the traveling surface 18, and at the same time, the side distance sensor 5f detects the end surface of the level difference 21, the robot shifts the gravity center 19 from rear to front through landing both the supporting legs 4 and 5, as shown in FIG. 7(c), by applying the third control function from the gravity-center supporting travel. Thereafter, as is shown in FIG. 7(e), it brings the supporting leg 5 to be released from the traveling surface 18, by applying the first control function, and thereby passing through the level difference 21 by changing into the gravity-center supporting travel on the supporting leg 4. Next, explanation will be made about traveling steps on the inclined surface, by referring to FIGS. 8(a) to 9(e). Those FIGS. 8(a) to 9(e) show the operation sequences of climbing up and down the inclined surface 22 by the moving robot 1. In the climb-up sequences, as shown in FIGS. 8(a) to 8(e), first the robot approaches to the inclined surface 22, as shown in FIG. 8(a), and it detects the inclined surface 22 in the moving direction thereof, through detection of gradually approaching of the traveling surface upon basis of the information from the floor-surface distance sensor 4e and detection of gradually approaching of the inclines surface 22 of the side-surface distance sensor 4f. Then, as is shown in FIG. 8(b), releasing the inverted two-wheels traveling condition therefrom, it brings the supporting leg 5 to contact on the ground through the second control function, and thereby keeping the static stability. Moving ahead in this condition, the robot exchanges the traveling mode thereof into the inverted two-wheels traveling condition at the time point when it climbs up to the top thereof, as is shown in FIGS. 8(c) and 8(d). In the climb-down sequences, as is shown in FIGS. 9(c) and 9(e), running on the inverted two-wheels travel up to the end of the inclined surface 22, first, the robot detects the starting position of the inclined surface 22 by means of the floor-surface distance sensor 4e, as is shown in FIG. 9(a), and then brings the supporting leg 5 to land on the inclined surface 22. This series of operations are achieved through the first and the third control functions. Thereafter, as is shown in FIG. 9(c), the robot 1 goes down the inclined surface 22 while supporting itself at the gravity center 19 thereof by means of the supporting leg 5. Thereafter, as is shown in FIGS. 9(d) and 9(e), it changes the traveling mode thereof from the gravity-center supporting travel into the inverted two-wheels travel through the second control function at the time point when the plane surface detection is established on the terminal edge of the incline surface 22.

With the present embodiment explained in the above, since it is possible to elevate the tips of the supporting legs which are disposed in front and rear of the main driving wheels, with remaining a very small gap between them, along a relief or up and down on the traveling surface following thereto, when running on the inverted two-wheels travel, then the elevating operation of the supporting legs are locked when fall-down of the moving robot is likely to occur, thereby enabling to prevent the fall down thereof, beforehand. Also, with provision of the sensor at the tip of the supporting legs, it is possible to detect the level difference and the incline surface, so as to shift into the statically stable traveling condition through contacting or landing of the supporting legs, as well as, the main driving wheels, thereby enabling to execute the stable traveling sequences for traveling over the level difference and the inclined surface.

Next, explanation will be made about other embodiment according to the present invention, by referring to FIGS. 10(*a*) to 11(*f*).

FIGS. 10(*a*) and 10(*b*) show a front view and a side view of the moving robot according to the present embodiment, for showing the structures of mechanisms therein. A moving robot 23 comprises main driving wheels 24 and 25, each of which is controlled in accordance with the inverted pendulum control, supporting legs 26, 27, 28 and 29 (but the supporting leg 29 is not shown in the figure), which are disposed in front and rear of those main driving wheels 24 and 25, a posture sensor 30 for detecting posture of the moving robot 23 with respect to the direction of gravity, and a controller apparatus 31 for controlling the mechanisms of the moving robot 23, upon basis of information from the posture sensor 30, etc.

At a tip of each of the supporting legs 26 are provided auxiliary wheels 26*a*, which are driven to travel by a motor 26*b*, and each of those auxiliary wheels 26*a* elevates up and down and further circle around an axis of the elevating direction by means of an elevating/circling mechanism 26*c*. As such elevating mechanism 26*c*, a ball-spline mechanism is applicable, for example. Of course, it is apparent that the same effect can be obtained, even if applying other mechanism/means thereto, but as far as it enable to elevate and also circle those auxiliary wheels 26*a*. Within a driving means of the elevating/circling mechanism 26*c* is installed an OFF brake not shown in the figures, wherein the elevating position thereof is fasten or fixed, mechanically, when cutoff occurs on an electric power source. Further, at the tip of the supporting leg 26 are provided a force sensor 26*d* for detecting a contacting counter force applying onto the auxiliary wheels 26*a*, a floor distance sensor 26*e* for measuring a gap between the tip of the supporting leg 26 and the traveling surface, and side-surface distance sensors 26*f* and 26*g*, each for measuring a relative distance between the structure on the floor surface and the supporting leg 26, respectively. The structures of the supporting legs 27 provided in front of the main driving wheels 24 and 25, as well as, supporting legs 28 and 29 (but the supporting leg 29 is not shown in the figure) provided in rear thereof, are same to those of the supporting leg 26, each comprising therein auxiliary wheels 27*a*, 28*a* or 29*a*, a motor 27*b*, 28*b* or 29*b*, an elevating mechanism 27*c*, 28*c* or 29*c*, a force sensor 27*d*, 28*d* or 29*d*, a floor-surface distance sensor 27*e*, 28*e* or 29*e*, and side-surface distance sensors 27*f* and 27*g*, 28*f* and 28*g*, and 29*f* and 29*g*. The controller 31 includes drive function of the auxiliary wheels 26*a*, 27*a*, 28*a* and 29*a*, and elevating drive function of the elevating/circling mechanisms 26*c*, 27*c*, 28*c* and 29*c*, i.e., fundamentally, having the control functions from the first one to the fourth one, which are mentioned in the first embodiment. Accordingly, the anti-tumbling control, the traveling over level difference, and the inclines surface traveling control, which are explained in the first embodiment, they are also applicable in the structures of the present embodiment.

Next, explanation will be operations of step traveling, being newly enabled according to the present embodiment. FIGS. 11(*a*) to 11(*f*) shows the steps of moving on the steps 33 by the moving robot 23. In those steps, it is conditioned that the depth of each one of the steps 33 has a size being equal or greater than that from a front edge portion of the auxiliary wheel 26*a* or 27 up to the center of the main driving wheel 24 or 25. First of all in FIG. 11(*a*), approaching to the steps 33 on the inverted two-wheels traveling, the robot stops when detecting the fact that it reaches to the steps 33 within a predetermined distance therebetween by means of the side-surface distance sensors 26*f* and 27*f* of the supporting legs 26 and 27, and as shown in FIG. 11(*b*), it elevates the supporting legs 26 and 27 up to the upper limits thereof. Next, the robot moves ahead, and at the time point when detecting that the supporting legs 26 and 27 reaches onto a top of a first one of the steps 33 by the floor-surface sensors 26*e* and 27*e* of the supporting legs 26 and 27, it elevates down the supporting legs 26, 27, 28 and 29, as is shown in FIG. 11(*c*), to touch the ground. After touching the ground of the supporting legs 26, 27, 28 and 29, the robot release the main driving wheels 24 and 25 from the inverted two-wheels traveling control, to be in the stopping condition thereof. Next, as is shown in FIG. 11(*d*), the moving robot 23 lifts the main body of itself through driving of the supporting legs 26, 27, 28 and 29 and the elevating/circling mechanisms 26*c*, 27*c*, 28*c* and 29*c*, so that lower end portions of the main driving wheels 24 and 25 come up to locate above the step of the steps 33. Next, the moving robot 23 moves ahead in this condition through driving of the supporting legs 26, 27, 28 and 29 and the auxiliary wheels 26*a*, 27*a*, 28*a* and 29*a*, and as is shown in FIG. 11(*e*), it stops at the time point when it confirms the approach to the step of the steps 33 by means of the side-surface distance sensor 26*f* or 27*f* of the supporting legs 26 and 27, or the side-surface distance sensor 26*g* or 27*g* of the supporting legs 28 and 29. At the time when completing the operation, the robot restores the main driving wheels 24 and 25 to the inverted two-wheels traveling control, and as is shown in FIG. 11(*f*), elevates the supporting legs 26, 27, 28 and 29 upwards; i.e., it stands up on the steps 33 only with the main driving wheels 24 and 25, under the inverted two-wheels traveling control. Repeating the operations mentioned above by referring from FIG. 11(*a*) to FIG. 11(*f*) enables the robot to climb up the steps 33. Climbing down of the steps 33 can be achieved, by conducting the operation steps reversely, i.e., from FIG. 11(*f*) to FIG. 11(*a*), fundamentally. However, timings of the up/down controls of the supporting legs 26, 27, 28 and 29 at each step are controlled, upon basis of detection of passage on the step by the floor-surface distance sensor 26*e*, 27*e*, 28*e* and 29*e*, respectively. With the present embodiment, it is also possible to achieve the traveling over the level difference, which was explained in the first embodiment, by considering the steps 33 shown in FIGS. 11(*a*) to 11(*f*) to be a one step, through the same control steps. With the method of traveling over the level difference explained in the first embodiment, theoretically, the height of the level difference, on which the robot can travel, is restricted to be equal or less than the radius of the main driving wheels 2 and 3 because it climbs up the level difference by means of griping forces of the main driving wheels 2 and 3, and actually the height being about 30% of the radius thereof can be considered to be a limit for the main driving wheels 2 and 3 to travel over. On the contrary to this, with the method of traveling over the steps in the present embodiment mentioned above, since the height of the step or the level difference depends on up/down strokes of the elevating/circling mechanisms 26c, 27c, 28c and 29c, but independent upon the diameter of the main driving wheels 24 and 25, therefore the root can travels over the level difference and the steps, being higher than that comparing to the first embodiment. Although omitting the details thereof in the traveling operations shown in FIGS. 11(*a*) to 11(*f*), however according to the present embodiment, each of the auxiliary wheels 26a, 27a, 28a and 29a is rotatable, independently, through the respective elevating/circling mechanisms 26c, 27c, 28c and 29c, i.e., having a function of moving in all directions. With using this function, it is possible to make the moving robot 23 opposite to or moving aside the steps 33. Of course, with using this function, it is also possible to let the robot to move into an arbitrary direction in the traveling on a plane ground.

With the present embodiment mentioned above, in addition to the fact that the anti-tumbling control and the control for traveling on the level difference or the inclined surface are obtainable, for the robot it is also possible to travel on the steps, and it can travel over the steps high in the height thereof independent from the diameter of the main driving wheels. Further, it is possible for the robot to move into all directions with an aid of the auxiliary wheels, and also move easily within the circumstances of being narrow on the plane ground; therefore, it can executes fine adjustment in the moving position/direction on the step.

Next, explanation will be made about further other embodiment according to the present invention, by referring to FIGS. 12(*a*) to 15(*e*).

Figure 12A:
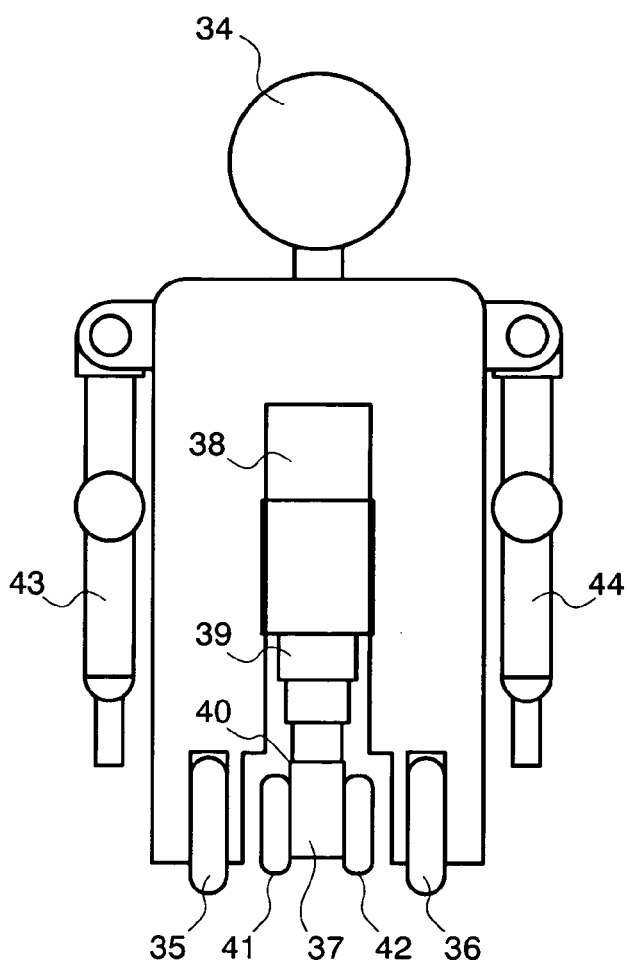
FIGS. 12(a) and 12(b) are the views for showing the structure of a mechanism of the moving robot, according to further other embodiment of the present invention.
Figure 12B:
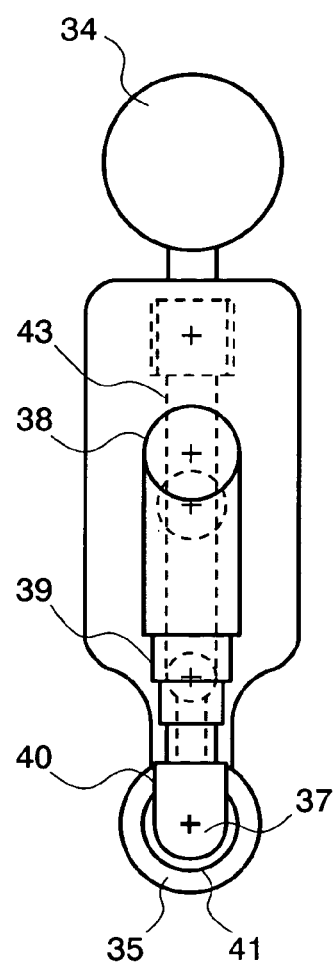

FIGS. 12(*a*) and 12(*b*) show a front view and a side view of the moving robot according to the present embodiment, for showing the structures of mechanisms therein. A moving robot 34 comprises main driving wheels 35 and 36, each of which is controlled in accordance with the inverted pendulum control, a supporting leg 37 being put between the main driving wheels 35 and 36, and arms 43 and 44 of the multi-number of degrees of freedom. The supporting leg 37 comprises auxiliary wheels 41 and 42 at the tip thereof, each of which is controlled in accordance with the inverted pendulum control, a circling mechanism for circling round the auxiliary wheels 41 and 42, a supporting-leg circling mechanism 38 for positioning the supporting leg 37, pivotally frond and back, and an expansion and contraction mechanism 39 for thrusting or retracing the tip of the supporting leg 37.

Figure 13A:
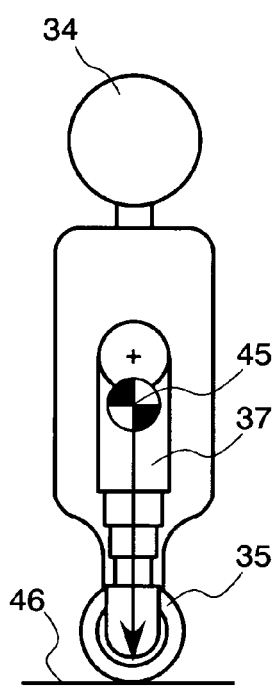
FIGS. 13(a) to 13(c) are the views for explaining an anti-tumbling operation in the moving robot, according to the further other embodiment of the present invention.
Figure 13B:
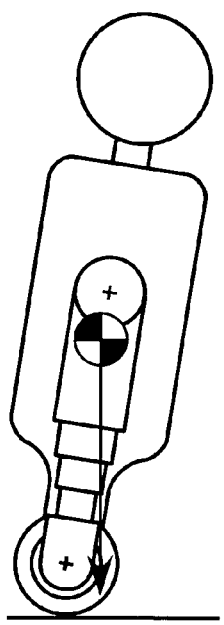
Figure 13C:
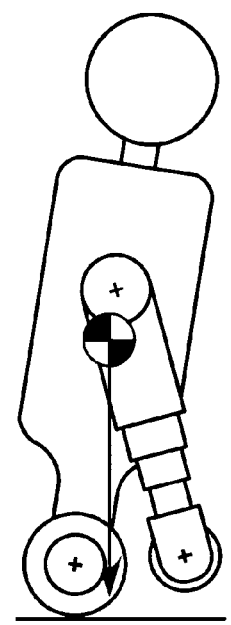
Figure 15A:
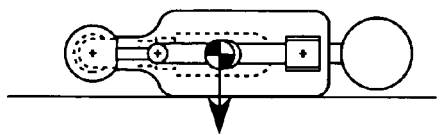
FIGS. 15(a) to 15(e) are the views for explaining a comeback operation from tumbling in the moving robot, according to the further other embodiment of the present invention.
Figure 15B:
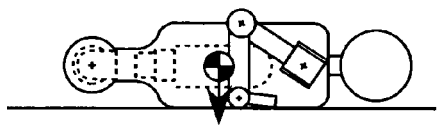
Figure 15C:
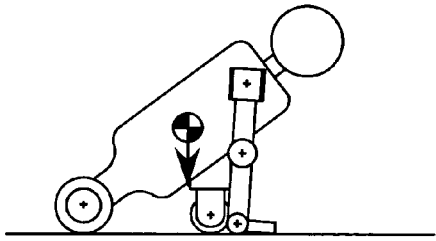
Figure 15D:
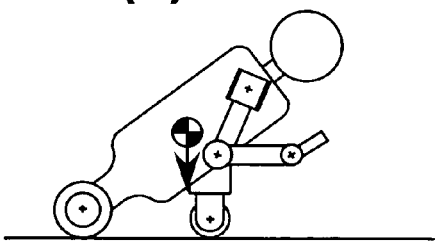
Figure 15E:
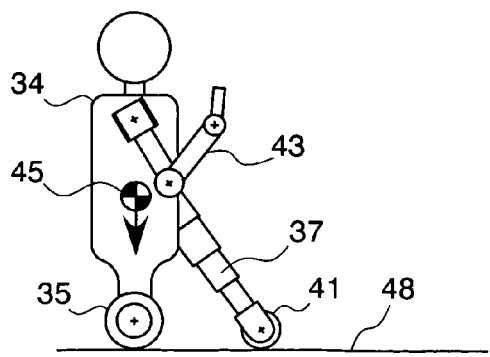

The anti-tumbling operation of the moving robot 34 with the present constructions will be explained, by referring to FIGS. 13(*a*) to 13(*c*). FIG. 13(*a*) shows a stopping posture of the robot during the inverted two-wheels travel on the main driving wheels 35 and 36, while FIG. 3(*b*) a traveling posture thereof. FIG. 13(*c*) shows the condition in the anti-tumbling movement thereof, wherein the moving robot 34 swings out the supporting leg 37 into the moving direction, when detecting a presage of falling down, i.e., protecting itself from falling down while keeping the posture thereof, contacting the auxiliary wheels 41 and 42 on the ground. Next, by referring to FIGS. 14(*a*) to 14(*g*), explanation will be made on the steps of moving on the steps. In FIG. 14(*a*), the robot stands up on one of steps 47 under the inverted two-wheels travel with an aid of the main driving wheels 35 and 36. Next, as is shown in FIG. 14(*b*), extending the supporting leg 37, so as to bring the auxiliary wheels 41 and 42 to contact on the ground, the moving robot 34 makes itself standing up through the inverted two-wheels traveling control of the auxiliary wheels 41 and 42, and further by extending the supporting leg 37, so as to lift up the main driving wheels 35 and 36. Next, as is shown FIG. 14(*c*), through driving of the supporting-leg circling mechanism 38, the moving robot 34 makes the main body thereof inclined, thereby moving the main driving wheels 35 and 36 up to the next step. During this, the moving robot 34 maintains the posture thereof to be in stable, so as not to fall down, through the inverted two-wheels traveling control of the auxiliary wheels 41 and 42. Next, as is shown in FIG. 14(*d*), the robot let the main driving wheels 35 and 36 to contact on the ground. Herein, the inverted two-wheels traveling control is released from the main driving wheels 35 and 36 and the auxiliary wheels 41 and 42, and as is shown in FIG. 14(*e*), the robot moves forwards so that the gravity center 45 thereof comes to be above the center of the main driving wheels 35 and 36. After completing this, as is shown in FIG. 14(*f*), initiating the inverted two-wheels traveling control upon the main driving wheels 35 and 36, the moving robot 34 makes stand up the entire body thereof and retracts the supporting leg 37, and thereby turning back to an initial condition shown in FIG. 14(*g*). Repetition of the processes shown from FIG. 14(*a*) to FIG. 14(*g*) enables the robot to travel over the steps 47. For climbing-down operation of the steps 47 may be achieved by conducting the processes of the climbing-up operation, reversely. The traveling over the level difference shown in the first and second embodiments can be achieved by considering the level difference to be the steps having only one (2) step. In relation to the traveling on the inclines surface, by taking the traveling mode of releasing the inverted two-wheels traveling controls of the main driving wheels 35 and 36 and the auxiliary wheels 41 and 42, so as to bring them to contact on the ground at the same time, it is possible for the robot to travel with stability. With the present embodiment, for the robot it is possible to achieve the recovery, i.e., stand up from the condition of falling down. The processes of that will be explained by referring to FIGS. 15(*a*) to 15(*e*). As is shown in FIG. 15(*a*), when the moving robot 34 falls down sidelong because the anti-tumbling control does not operate well, through the operation of the arms 43 and 44, the moving robot 34 turns itself to lie on it's face in the condition thereof. Next, as is shown in FIG. 15(*b*), through the operation of the arms 43 and 44, the moving robot 34 lifts up an upper body thereof. Then, as is shown in FIG. 15(*c*), when the robot lifts up the upper body at the maximum, it thrust out the supporting leg 37, and then as is shown in FIGS. 15(*d*) and 15(*e*), through driving force of extending the supporting leg 37, the moving robot 34 stands up. Thereafter, it restarts the inverted pendulum control upon the main driving wheels 35 and 36, so as to retracts the supporting leg 37. With this embodiment, at the tip of the supporting leg 37 is provided a circling mechanism 40, so as to exchange the landing of the main driving wheels 35 and 36 and the auxiliary wheels 41 and 42 on the ground; i.e., circling of the directions of the auxiliary wheels 41 and 42 before landing the auxiliary wheels 41 and 42, during FIGS. 14(*a*) to 14(*b*), enables correction in the position and the direction on the step, as is shown in the second embodiment. This traveling operation can be achieved also on the plane ground, and enables moving in all direction, being similar to that mentioned above in the second embodiment.

With the present embodiment explained in the above, the robot is able to achieve all the modes of traveling obtainable with the first and second embodiments, and further it enables to recover from the fall-down condition thereof by itself.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A moving robot, comprising:
an upper body; and
a coaxial two-wheel moving mechanism arranged to support the upper body to move in an advance direction in accordance with an inverted pendulum control, the coaxial two-wheel moving mechanism having a pair of main driving wheels each of which is controlled in accordance with the inverted pendulum control, and one or more supporting legs disposed front and rear of the main driving wheels with each supporting leg provided with an auxiliary wheel disposed at a tip and controlled in accordance with the inverted pendulum control;
a posture sensor arranged in the upper body, to detect a posture of the moving robot with respect to the direction of gravity; and
a controller arranged in the upper body, to control movement of the coaxial two-wheel moving mechanism, including the main driving wheels and the one or more supporting legs, based on information from the posture sensor;
wherein a relative position of said auxiliary wheel is changeable with respect to the main driving wheels of said coaxial two-wheel moving mechanism.

2. The moving robot as claimed in claim 1, wherein the one or more supporting legs are arranged to support the auxiliary wheels to elevate up and down with respect to a traveling surface.

3. The moving robot, as described in the claim 2, wherein said auxiliary wheel is a follower wheel.

4. The moving robot, as described in the claim 3, wherein said auxiliary wheel has a steering circling drive mechanism.

5. The moving robot claimed in claim 2, wherein the tip of the supporting leg is provided with a force sensor arranged to detect a contact counterforce applying onto the auxiliary wheels, a floor distance sensor arranged to measure a gap between the tip of the supporting leg and the traveling surface, and side-surface distance sensors arranged to measure a relative distance between the supporting leg and the traveling surface.

6. The moving robot, as described in the claim 1, wherein said supporting leg comprises a rotating mechanism of being able to move said auxiliary wheel, pivotally, into the driving direction with respect to said moving mechanism, and a thrusting mechanism of being able to control a distance from a rotation center of said rotating mechanism to said auxiliary wheel.

7. The moving robot, as described in the claim 6, wherein said auxiliary wheel is made of a follower wheel, and further has a means for controlling a driving force into a forward moving direction through the inverted pendulum control, in a similar manner to that of said main driving wheels.

8. The moving robot, as described in the claim 7, wherein said auxiliary wheel has a steering circling drive mechanism.

9. The moving robot, as described in the claim 1, further comprising a means for measuring a relative distance between a tip of said supporting leg and a traveling surface, and a means for controlling positioning of said supporting leg so as to maintain it to be a predetermined relative distance.

10. The moving robot, as described in the claim 9, wherein said supporting leg is fixed in position thereof, when an abnormality occurs within a control system, or when an electric power source is cut off, or when said moving robot is inclined in posture thereof, to be equal or greater than an allowable value thereof, under a condition of driving said main driving wheels upon basis of said inverted pendulum control.

11. The moving robot, as described in the claim 9, further comprising a control means for thrusting out said supporting leg in a fall-down direction of said moving robot, so as to recover said moving robot from the fall-down posture thereof, when an abnormality occurs within a control system, or when an electric power source is cut off, or when said moving robot is inclined in posture thereof, to be equal or greater than an allowable value thereof, under a condition of driving said main driving wheels upon basis of said inverted pendulum control.

12. The moving robot, as described in the claim 11, further comprising an emergency electric power source other than said electric power source, wherein driving control of said supporting leg is conducted for anti-tumbling thereof through said emergency electric power source.

13. The moving robot, as described in the claim 1, further comprising a means, brining said at least one supporting leg to be in contact on a driving surface on a ground, and for controlling a thrusting position of said supporting leg being in contact on the ground, so as to maintain a projection position of gravity within an area, which is defined through connecting a point of said supporting leg contacting on the ground and points of said main driving wheels contacting on the ground.

14. The moving robot, as described in the claim 13, wherein assumption is made on an inclination angle of the traveling surface from an amount of thrusting said supporting leg to be in contact on the ground and a posture angle of said moving robot inclined, and determination is made that the traveling surface is a plane surface in case when the inclination angle of the traveling surface is less than a predetermined value, so as to initiate said inverted pendulum control on said main driving wheels.

* * * * *

UNITED STATES PATENT AND TRADEMARK OFFICE
CERTIFICATE OF CORRECTION

PATENT NO. : 7,677,345 B2  Page 1 of 1
APPLICATION NO. : 11/349920
DATED : March 16, 2010
INVENTOR(S) : Yuji Hosoda It is certified that error appears in the above-identified patent and that said Letters Patent is hereby corrected as shown below:

Title Page, Item (22) Filed: please change the filing date from "April 17, 2006" to --February 9, 2006--.

Signed and Sealed this

Thirteenth Day of July, 2010

David J. Kappos
*Director of the United States Patent and Trademark Office*